US005626989A

United States Patent [19]
Doundoulakis

[11] Patent Number: 5,626,989
[45] Date of Patent: May 6, 1997

[54] QUASI-SOLID PLATE STORAGE BATTERY

[75] Inventor: George J. Doundoulakis, North Bellmore, N.Y.

[73] Assignee: Long Island Lighting Company, Hicksville, N.Y.

[21] Appl. No.: 344,337

[22] Filed: Nov. 22, 1994

[51] Int. Cl.$^6$ .................................................. H01M 4/74
[52] U.S. Cl. .................. 429/233; 429/243; 29/2; 29/623.1; 29/731
[58] Field of Search .................... 429/94, 233, 243, 429/245; 72/130, 177; 29/2, 623.1, 730, 731

[56] References Cited

U.S. PATENT DOCUMENTS

| | | |
|---|---|---|
| 509,270 | 11/1893 | Usher . |
| 1,032,158 | 7/1912 | Pörscke et al. ................. 429/243 |
| 1,271,933 | 7/1918 | Palmer . |
| 1,727,552 | 9/1929 | Marsh .................. 429/243 X |
| 2,163,063 | 6/1939 | Romanoff . |
| 2,571,616 | 10/1951 | Ruben ...................... 429/94 |
| 3,272,653 | 9/1966 | Solomon et al. . |
| 3,414,437 | 12/1968 | Doundoulakis et al. . |
| 3,532,550 | 10/1970 | Truitt . |
| 3,749,608 | 7/1973 | Sarbacher . |
| 4,151,331 | 4/1979 | Hug et al. .................... 429/94 |
| 4,399,607 | 8/1983 | May ......................... 29/730 X |
| 4,434,638 | 3/1984 | Sivachenko ................... 72/130 |
| 4,735,873 | 4/1988 | Doundoulakis . |
| 4,948,685 | 8/1990 | Ohsawa et al. ............. 429/245 X |
| 5,045,415 | 9/1991 | Witehira ...................... 429/81 |
| 5,123,160 | 6/1992 | Hopwood .................... 29/730 |
| 5,154,989 | 10/1992 | Howard et al. ............. 429/160 |
| 5,250,373 | 10/1993 | Muffoletto et al. .......... 429/161 |

*Primary Examiner*—Stephen Kalafut
*Attorney, Agent, or Firm*—Dilworth & Barrese

[57] ABSTRACT

A storage battery having various cell constructions to increase the surface-to-weight ratio of active material exposed to electrolyte ions, to reduce internal resistance, and to extend the life of the battery is provided. One configuration for the battery cell utilizes pleated positive and negative plates which are monolithically coupled to respective electrodes. Another configuration for the battery cell utilizes a single positive plate and a single negative plate which are interrelated in, for example, a serpentine configuration.

32 Claims, 10 Drawing Sheets

५,६२६,९८९

QUASI-SOLID PLATE STORAGE BATTERY

BACKGROUND

1. Technical Field

The present invention relates to storage batteries configured to increase the surface-to-weight ratio of active material exposed to electrolyte, to increase ampere-hour (Ah) capacity per kilogram (kg) of weight, to reduce the internal resistance of the battery, and to decrease cell deterioration by providing a uniform plate-electrode construction.

2. Description of the Related Art

In conventional batteries, such as lead-acid and alkaline batteries, solid active materials, such as spongy lead, lead peroxide and lead sulfate, are provided in the form of pastes supported by conductive grids on cathode and anode plates immersed in electrolyte. The negative and positive plates are rigidly attached to negative and positive cell electrodes respectively. Such conventional batteries are subject to inherent problems which limit their performance.

a. Conventional Lead Acid Batteries

Conventional lead-acid batteries typically have a number of cells connected in tandem. Each cell is separated from its adjacent cell by a solid wall so that the electrolyte from one cell cannot communicate with the electrolyte in the adjacent cell. Each cell further includes a multiplicity of positive and negative plates (typically 7 to 37 plates) which are sequentially positioned and firmly attached to respective positive and negative lead electrodes by lead electrode interconnections or buses. Each plate has a grid lattice made of antimonial lead, and active solid materials which are pressed onto the grid lattice. The solid active materials supported by the grids are in the form of a powder mixed with cohesive substances to form pastes. In lead-acid batteries, the active material in the charged state for the positive plate is lead peroxide and the active material in the charged state for the negative plate is lead. It should be noted that the active materials in the discharged state for both positive and negative plates is lead sulfate ($PbSO_4$). The grid is provided to support the paste, and to conduct electricity between the solid active material and the electrodes of the cell. Insulating separators permeable to electrolyte ions are positioned between opposite polarity plates to prevent the plates from making electrical contact (i.e., from shorting).

One drawback associated with conventional lead-acid batteries is that the non-active lead which makes up the grids, the electrodes and the electrode buses, account for approximately half the weight of the battery without contributing to its ampere-hour (Ah) capacity, i.e., the overall active surface-to-weight ratio of the battery is low.

A second drawback of conventional lead-acid batteries is that only a small portion of the electrolyte is physically contained between the plates, where it can easily exchange ions with the solid active materials. To illustrate, as the plates and separators are pressed together, they limit the freedom of movement of the electrolyte ions therebetween. During fast discharges, the allowable density change in the electrolyte that is located between the plates is quickly consumed at only a fraction of the total ampere-hour discharge capacity of the battery.

A third drawback associated with conventional lead-acid batteries is the relatively high internal resistance. Various factors account for the high internal resistance. For example, some of the internal resistance is due to the collision of electrolyte ions as they try to pass through the separators and through the outer particle layers to reach particles deep within the active paste. A major contributing factor to the internal resistance is an effective resistance, which is a consequence of multiple contact resistance in tandem. Multiple contact resistance is defined as the series resistance encountered by the electrons as they move from particle to particle within the paste to reach the grid. To illustrate, the solid active materials are typically in the form of fine powder mixed with cohesive agents and other substances known as expanders, which also act as a conductor for electrons to travel along as the electrons move to or from particles located away from the grid. As a result, the effective resistance between an active particle and the grid varies depending on the distance of the particle from the grid. The effective resistance can range between a few ohms for particles located in close proximity to the grid, and several thousand ohms for particles located far from the grid. While the overall effective resistance is reduced by the high number of parallel paths the electrons may travel along, the effective resistance still remains high enough for conventional lead acid batteries to lose as much as 30% to 40% of their energy in terms of thermal losses. The expression $Wr=I^2R$ represents the energy losses, where I represents the battery current during charge or discharge expressed in amperes, R is the battery internal resistance in ohms and Wr represents the energy lost expressed in watts.

The internal resistance also affects the output potential of the battery during operation by introducing a voltage drop, $Vr=IR$. Under high rates of discharge, the internal voltage drop substantially increases to the extent that the minimum output voltage needed by the load cannot be reached, while substantial energy still remains in the battery.

Another drawback in conventional lead-acid batteries is their relatively short life. Various reasons account for the short life span of such batteries. For example, one reason is the oxidation of the positive plate grid material which occurs when the battery is charged. As a result, the strength and electrical conductivity capabilities of the positive plate grid deteriorates to the point where the plate grid eventually collapses. Deterioration of the plate grid occurs more rapidly in the region where the plates having the same polarity are connected together via the lead electrode bus. In addition, at the points of contact between plates, especially the positive plates, gradual oxidation of the contact surfaces introduces high contact resistance in the electric conduction path. Other reasons contributing to a battery's deterioration is the shedding of the active paste particles during high rates of charge and discharge, and the creation of disruptive hydrogen and oxygen bubbles, especially during overcharge, which cause paste particles to dislodge. The dislodged particles which are shed can accumulate at, for example, the bottom of the battery and cause electric shorts between two opposite polarity plates.

b. Conventional Alkaline Storage Batteries

Conventional alkaline storage batteries are the nickel-iron cell (Edison cell), the nickel cadmium cell (Junker cell), and the zinc-manganese dioxide cell. Such alkaline storage batteries also suffer high internal resistance induced problems which make the batteries unsuitable for certain applications.

For example, in the Edison battery, the active materials are nickel oxyhydrate (NiOOH) as the positive active material, finely divided iron as the negative active material, and approximately 21% potassium hydroxide (KOH) as the electrolyte. During discharge, oxygen is transferred, via the electrolyte, from the positive active material to the negative active material. Even though the electrolyte acts only as an oxygen transfer agent, its viscosity does affect the internal resistance of the cell, indicating that a shorter path for the oxygen ions through the electrolyte would be desirable. In addition, the contact resistance between the iron particles, multiplied by the large number of such particles through which the electrons must travel to reach the electrodes, also contributes to the internal resistance of the battery. As in lead-acid batteries, the internal resistance in conventional alkaline batteries causes an internal voltage drop proportional to the battery current and a heat loss proportional to the square of such current.

c. Quasi-Fluid Batteries

Another type of storage battery is a quasi-fluid storage battery which provides the active materials in terms of thin-walled convoluted globules. The quasi-fluid storage batteries utilizing thin-walled convoluted globules are described in U.S. Pat. No. 4,735,873. While implementation of the globules is an effective configuration for certain uses, other uses require more efficient cell configurations.

Therefore, a need exists for an efficient battery cell configuration which increases the surface-to-weight ratio of active material exposed to electrolyte and which enhances the electrical connection between the active material and the cell respective electrode.

SUMMARY

The present invention relates to storage batteries which utilize monolithic cell construction techniques to increase the structural strength of the cathode and anode plates, and to increase the surface-to-weight ratio of active material exposed to electrolyte, while at the same time reducing the internal resistance of the battery. Accordingly, the present invention provides a storage battery which includes a casing having positive and negative output terminals extending therefrom, and at least one battery cell positioned within the casing and immersed in an electrolyte. In one embodiment, the battery cell includes at least one pleated negative polarity plate positioned adjacent at least one pleated positive polarity plate, and at least one separator positioned between the pleated negative polarity plate and the pleated positive polarity plate. The pleated plates may be solid foil plates having perforations spatially positioned therethrough. Alternatively, the pleated plates may be fabricated from woven threads. The cell construction also includes corresponding positive and negative electrodes which are monolithically or otherwise securely and conductively coupled to the pleated plates. The negative electrode of the cell with the lower potential and the positive electrode of the cell with the higher potential are coupled to the corresponding negative and positive output terminals preferably via an electrode bus.

Preferably, each battery cell includes a plurality of pleated negative polarity plates and a plurality of pleated positive polarity plates, wherein each negative polarity plate is positioned adjacent a positive polarity plate. In this configuration, each negative polarity plate is monolithically interconnected by a negative electrode bus to form the negative electrode, and each positive polarity plate is monolithically interconnected by a positive electrode bus to form the positive electrode.

The present invention also provides alternative cell constructions to provide the desired surface-to-weight ratio and the desired structural integrity of the storage battery. In one alternative embodiment, the battery cell has a single negative polarity plate interrelated in a serpentine configuration with a single positive polarity plate, and at least one separator positioned between the interrelated plates.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
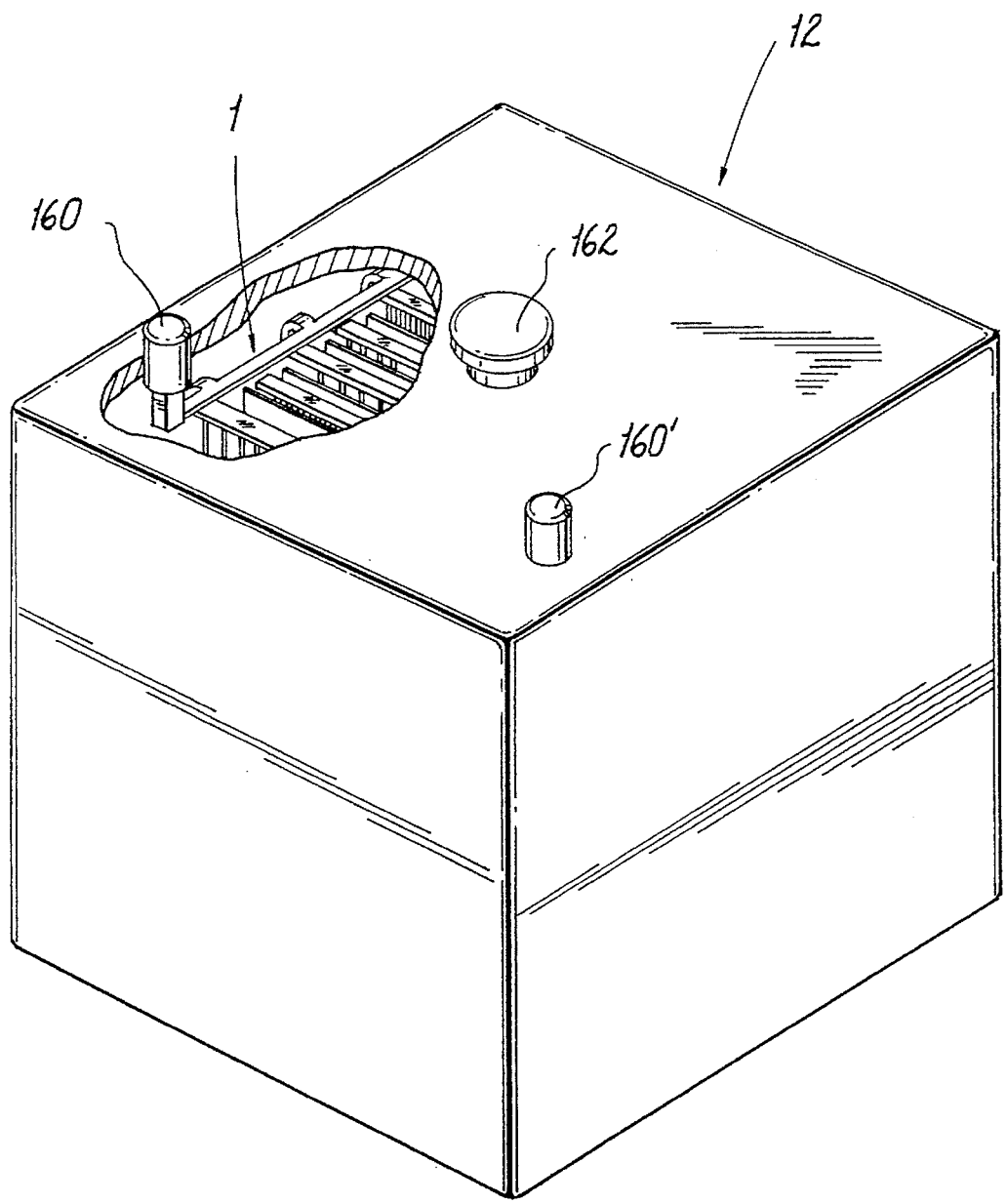
FIG. 1 is an isometric view in partial cross-section of an exemplary storage battery in accordance with the present invention.

The present invention provides various storage battery and battery cell configurations which increase the surface-to-weight ratio of active material exposed to electrolytes. In addition, the configurations described herein increase the structural strength of the cathodic and anodic plates and decrease the internal resistance of the cell. The storage battery has a casing defined by walls 12, at least one cell 1 positioned within the casing, and output terminals 160 and 160' for positive and negative polarity connections. Although one cell is shown in FIG. 1, multiple cells may be connected in series to increase the output voltage of the storage battery. The storage battery described herein and shown in FIG. 1 provides numerous advantages over the existing art as will be described hereinbelow.

Cells with Multiple Pleated Plates

Figure 2:
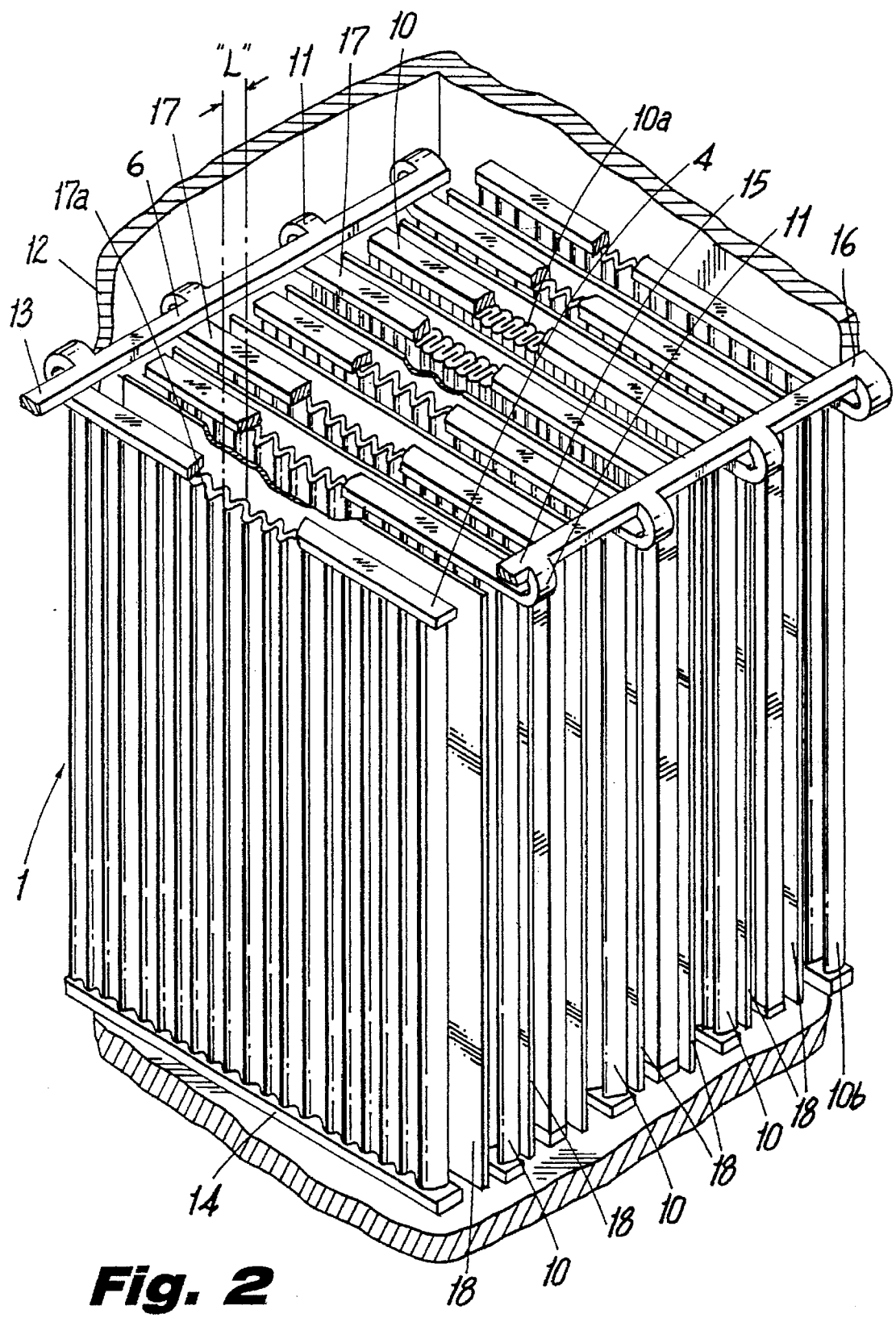
FIG. 2 is an isometric cut-away view of one embodiment of a battery cell according to the present invention, illustrating a pleated plate construction in partial cut away.

Referring to FIGS. 1 and 2, a lead-acid battery cell 1 according to one embodiment of the present invention is shown. The cell is typically positioned within the housing or casing defined by walls 12. The cell includes a predefined number of negative plates 17, and a predefined number of positive plates 10, insulated from shorting through separators 18.

Preferably, each plate is fabricated from a solid lead sheet and may vary in thickness between about 1.5 mm and about 7.5 mm. However, the solid sheet may also be made of materials having similar characteristics to the above noted lead sheet, such as compressed flattened lead fibers and woven flattened lead fibers. To increase the surface area of lead in the cell, the plates are pleated. Preferably, the density of pleats is uniform for both the positive and negative polarity plates and the length "L" of each pleat, shown in FIG. 2, is preferably, 0.25 cm. However, the length "L" and the pleating density for the negative and positive plates may vary, as shown by the pleating density in pleated plates 10a and 17a. The density of the pleats may vary between a flat sheet (0 pleats/cm) and about 500 pleats/cm and is dependent upon various factors, e.g., the thickness of the active layer and the desired current capacity. To illustrate, the density of the pleats together with the thickness of the active layer on each side of the pleated sheet determine the amount of active lead per plate which reacts with the electrolyte, and thus determining the ampere-hour capacity of the cell. Utilizing Faraday's law, it takes 7.73 grams of lead to react with the electrolyte to produce one ampere-hour of cell capacity. Thus, using a 0.001 cm thick lead foil sheet having an active layer of approximately 0.0004 cm on each surface of the lead sheet, the ampere-hour capacity would be about one milliampere-hour per square centimeter of the sheet. In this example, a lead utilization efficiency of about 80 percent is achieved, which is about four times the lead utilization efficiency of conventional batteries using the same amount of lead.

Figure 3:
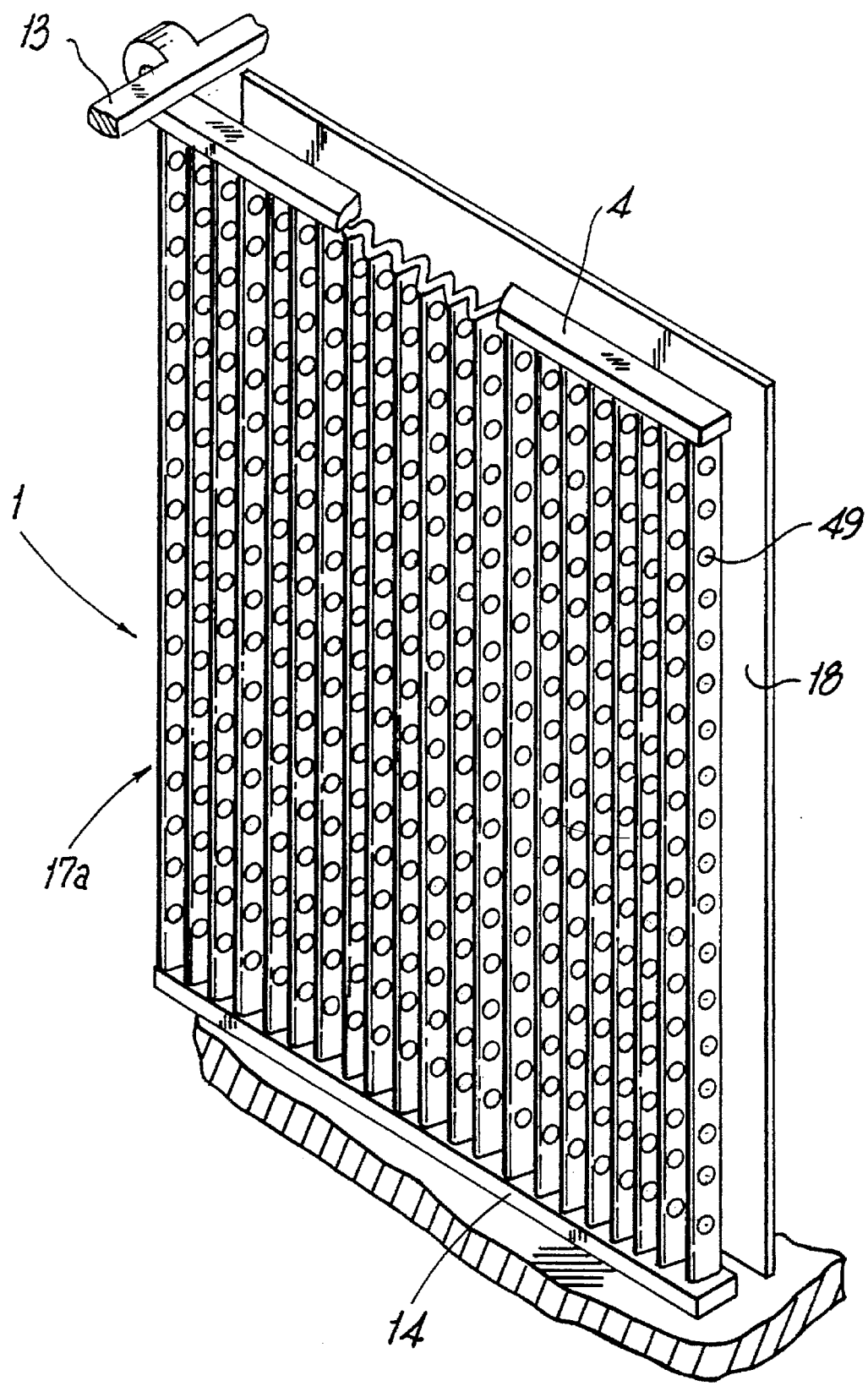
FIG. 3 is an isometric view of a portion of the cell construction of FIG. 2, illustrating pleated plates having perforations therethrough in partial cut away.

In addition, the pleating density for each plate is preferably continuous along the length of the plate and uniform for both plates. However, the pleat density for each plate may vary between the positive and negative plates or along the length of each individual plate. For example, the pleat densities shown in pleated plates 10a and 17a may be combined along a single plate. Utilizing the pleat configuration shown in FIG. 2, the surfaces on both sides of each plate 10 and 17 can exchange ions with the surface of the adjacent opposite polarity plate. By varying the pleating densities, the surface area of the plate which can exchange ions will either increase or decrease. In addition, the ion exchange between the plate adjacent the wall of housing 12 is decreased because one side of the plate is not adjacent to an opposite polarity plate. To compensate for this decreased ion exchanged, the plates next to the plates adjacent the walls of housing 12, namely plates 10b and 17a, may have a higher pleat density for providing additional ions for processing both sides of the end plates. To further increase the ion exchange, each plate may be perforated, shown by perforations 49 in FIG. 3, to allow the electrolyte to flow therethrough which permits the ions to contact both surfaces of each plate.

Figure 4:
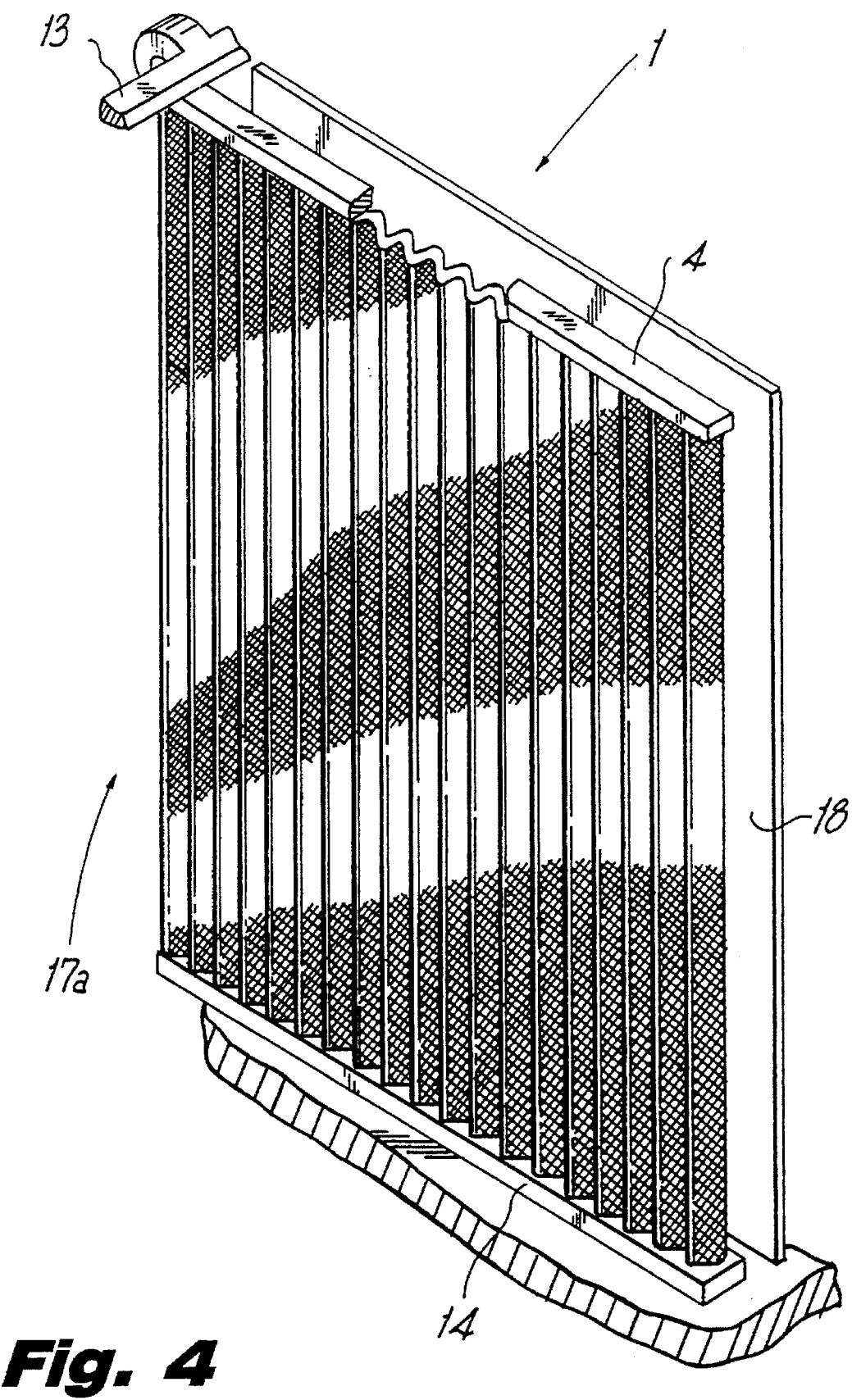
FIG. 4 is an isometric view of a portion of the cell construction of FIG. 2, illustrating pleated plates fabricated from woven threads in partial cut away.

An alternative construction for the plates is shown in FIG. 4. In this embodiment, the plates are manufactured from flattened lead wool, with randomly arranged threads, or with such threads woven into a cloth-like material and pressed down to a predefined thickness, such as 0.001 cm, before pleating. This woven construction permits the electrolyte to flow therethrough and exchange ions with the interior plate material. The density of the woven threads depends on various factors including, for example, the thread diameter before flattening.

Referring again to FIG. 2, upper strips 4 and lower strips 14 are cast along the top and bottom edges of each plate 10 and 17, as shown. The upper and lower strips 4 and 14, respectively, are provided to support the plates, as well as to provide a conductive medium between electrodes 6 and 16 and plates 17 and 10 respectively. The upper and lower strips 4 and 14 are preferably made of solid lead. However, other conductive materials, such as antimony-lead or conductive plastic, may be utilized. As shown, the electrode 6 serves to interconnect the negative plates 17, and the electrode 16 interconnects the positive plates 10 of the cell. One end 13 of the negative electrode 6 is connected to the negative terminal 160 of the battery, as shown in FIG. 1. Similarly, one end 15 of electrode 16 is connected to positive terminal 160' of the one cell battery.

Figure 5:
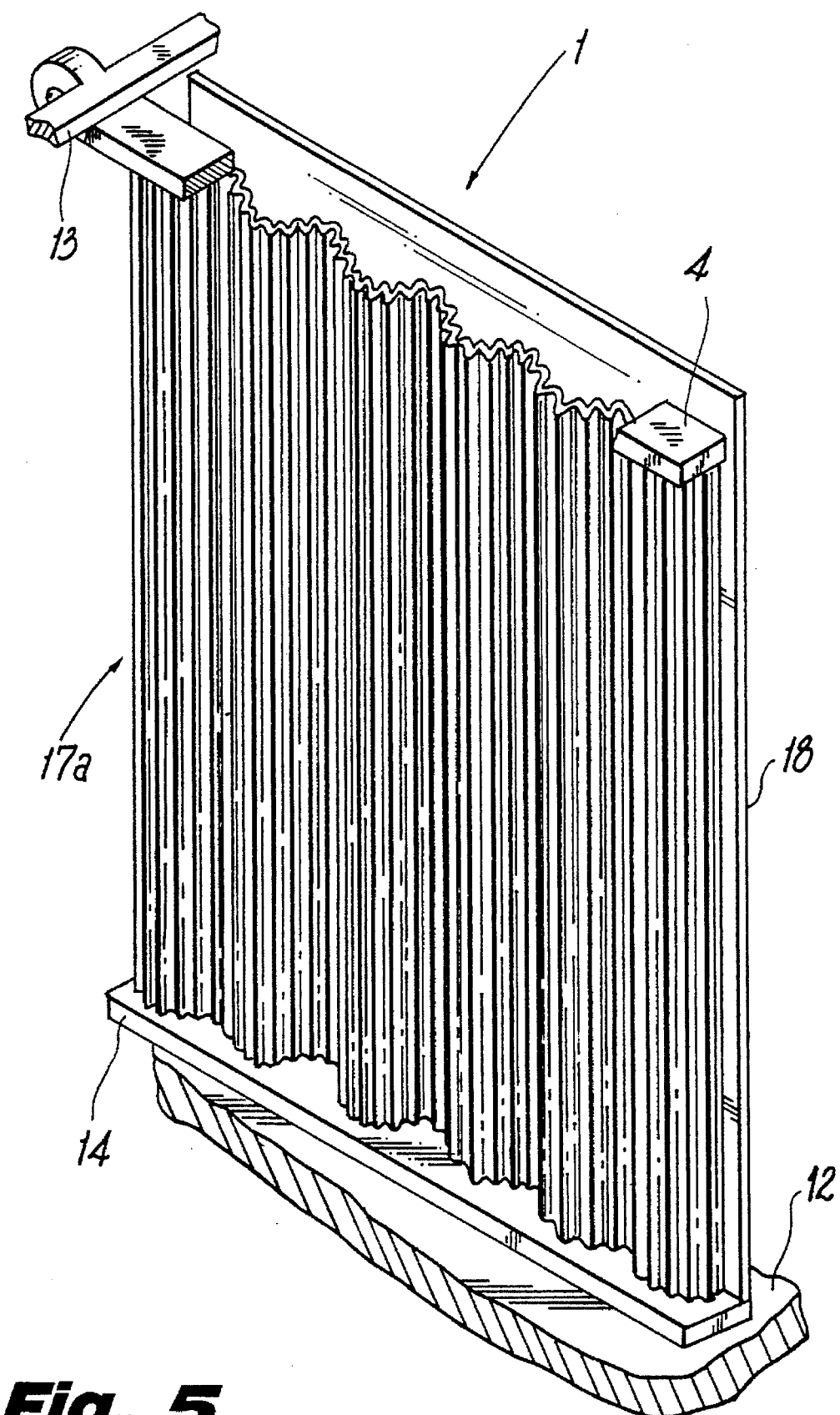
FIG. 5 is an isometric view of a portion of the cell construction of FIG. 2, illustrating pleated plates folded in a corrugated-type construction.

Another alternative construction for the plates is shown in FIG. 5. In this embodiment, the pleated plates are folded to form a corrugated-type structure which increases the structural stability of the plates as well as providing additional surface area to contact the electrolyte. As shown in FIG. 5, the corrugated type structure has a folding density which differs from the pleating density.

As noted above, multiple cells may be connected in series. If the cells are connected in series, the negative electrode end 13 may be connected to a positive electrode in the series cell, and the positive electrode end 15 may be connected to a negative electrode in the series cell. It is also contemplated that only upper strips are utilized as a conductive medium between the electrodes and the plates. In this configuration, the bottom edge may be cemented onto the adjacent separator to prevent it from moving and for forming a more rigid structure.

Deterioration of the plate occurs rapidly at the connection between the electrode and the plate, as described above. To inhibit cell deterioration, strips 4 and 14 are preferably fused to each plate to form a monolithic type plate and electrode construction. In addition, the ends of the electrode conductors dedicated for each polarity (e.g., electrode extensions 11) and electrodes 6 or 16 are fused together to form a single interconnecting electrode. This construction avoids the increased internal resistance which occurs at the connection point of the interconnecting electrode and the surface contacts between plates. If a conductive plastic may be used as the conductive material for strips 4 and 14, the conductive plastic may be monolithically connected to each plate, preferably by heat shrinking.

To further increase the useful life of the battery, the electrode strips 4 and 14 and the electrodes 6 and 16 are sufficiently thick to continue functioning even though the external surfaces of the strips and electrodes may interact with the electrolyte. Preferably, the cross-section of the strips and electrodes has a thickness sufficient to conduct the current from or to the plates. Preferably, the thickness of the cross-section of the strips and electrodes is about 0.25 cm.

As noted, the pleated structure may be provided in various densities along the surface of the plate, by varying the number of pleats per centimeter. During fabrication, the pleats on the lead sheet may be compacted so as to define a relatively high density of pleats. The density can then be decreased by pulling the pleats apart, or the density can be increased by further compressing the pleats. It should be noted that instances may occur when the lead may swell after the pleated sheets are fabricated and undergo charge/ discharge cycles during the forming process, to the point where the volume left for the electrolyte is reduced. To compensate for lead swelling, the pleats and plates should be sufficiently spaced to permit sufficient flow of the electrolyte between the pleats. Preferably, a 30% factor is used to compensate for lead swelling. Once the density of the pleats has been adjusted to the desired density, the pleated structure self adjusts to allow for the swelling of the lead. In addition, the thickness of the plates may also increase by about 30% during the forming process. Therefore, additional spacing may be necessary between plates of opposite polarity and/or between the plates and the separators, so that after the lead swelling occurs, an amount of electrolyte having an average density of 1.215 and weighing about one third the weight of the lead in the plates, is permitted to circulate through the cell.

In addition, the pleated structure of the plates provides a conduit for gas generated during the chemical reaction between active materials and electrolyte, to the space at the top of the case where it can escape through a loosely fitting cover 162 within an opening in the case 12. The opening and cover is present in lead acid batteries for the purpose of relieving pressure and for permitting electrolyte fluid to be occasionally added to the battery. Alternatively, the separators 18 may have a sufficient thickness and consistency to absorb and retain substantial amounts of gas, e.g., oxygen and hydrogen, generated by the chemical reaction. A suitable material for separators which absorb and retain gas is a recombinant battery separator mat, such as an ACUPORE mat manufactured by the Manning Nonwoven Division of Lydall, Inc.

Cells with Serpentine Folded Plates

Figure 6:
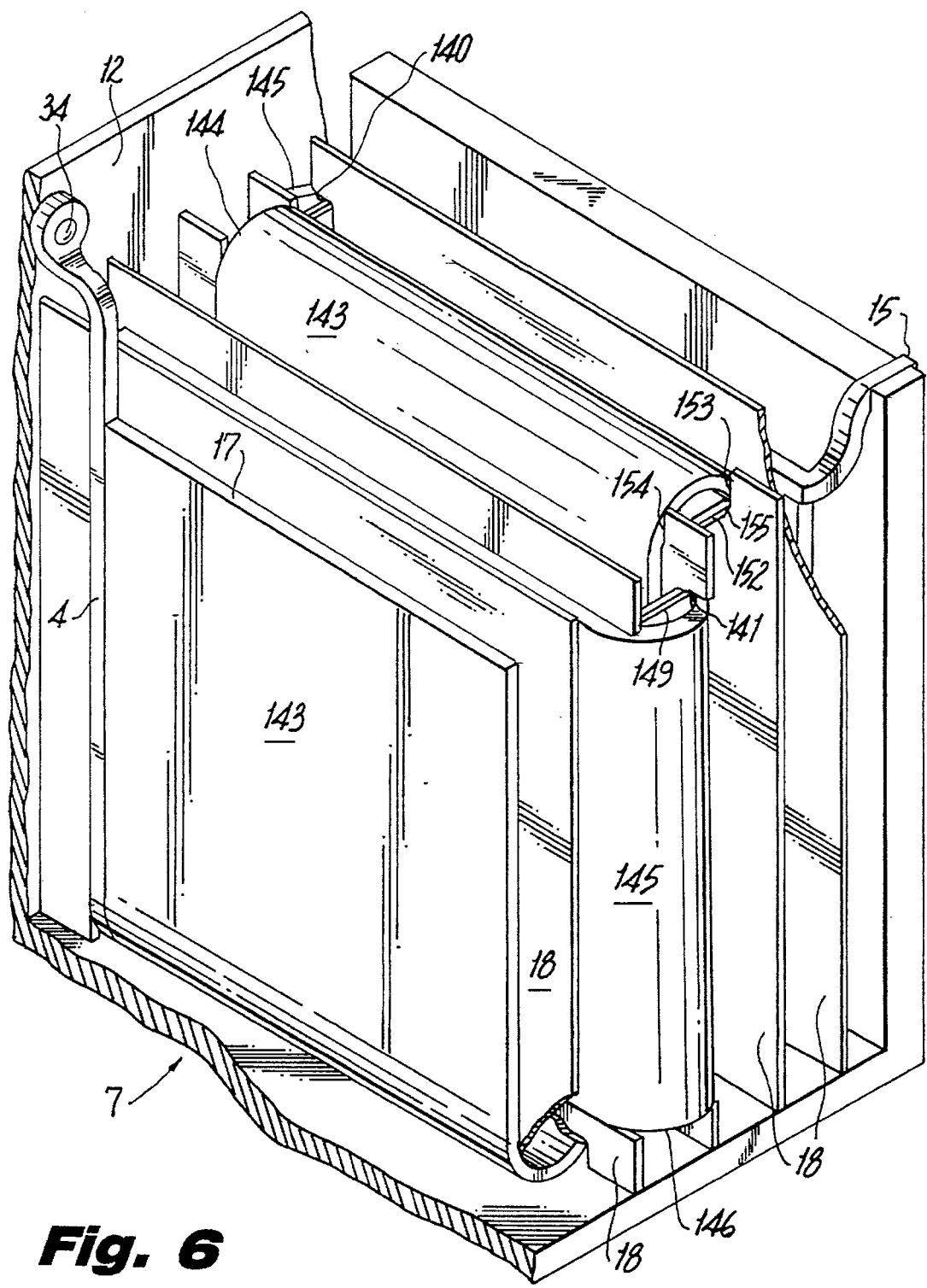
FIG. 6 is an isometric cut-away view in partial cross-section of an alternative embodiment of a battery cell according to the present invention, illustrating a single plate construction for each polarity.

Referring to FIG. 6, an alternative cell configuration is shown. In this embodiment, each cell has two plates, a negative plate 143 and a positive plate 145 which are interrelated such, as by interweaving, to form the cell. The negative plate 143 may be a single convoluted member, for example, a substantially "U" shaped member, or a substantially planar member interrelated with a positive plate 145 which may be a single convoluted member, for example, a substantially "U" shaped member, or a substantially planar member. Each "U" shaped member preferably defines a pair of sides and a cross-arm therebetween. The interrelation of the plates may be achieved in various ways. For example, the substantially "U" shaped plates may be positioned so that one side of the positive plate is positioned between the pair of sides of the negative plate and vice versa. Alternatively, the negative plate may be a "U" shaped member and the positive plate may be a planar member positioned between the sides of the "U" shaped negative plate. Similarly, the positive plate may be a "U" shaped member and the negative plate may be a planar member positioned between the sides of the "U" shaped positive plate.

Figure 7:
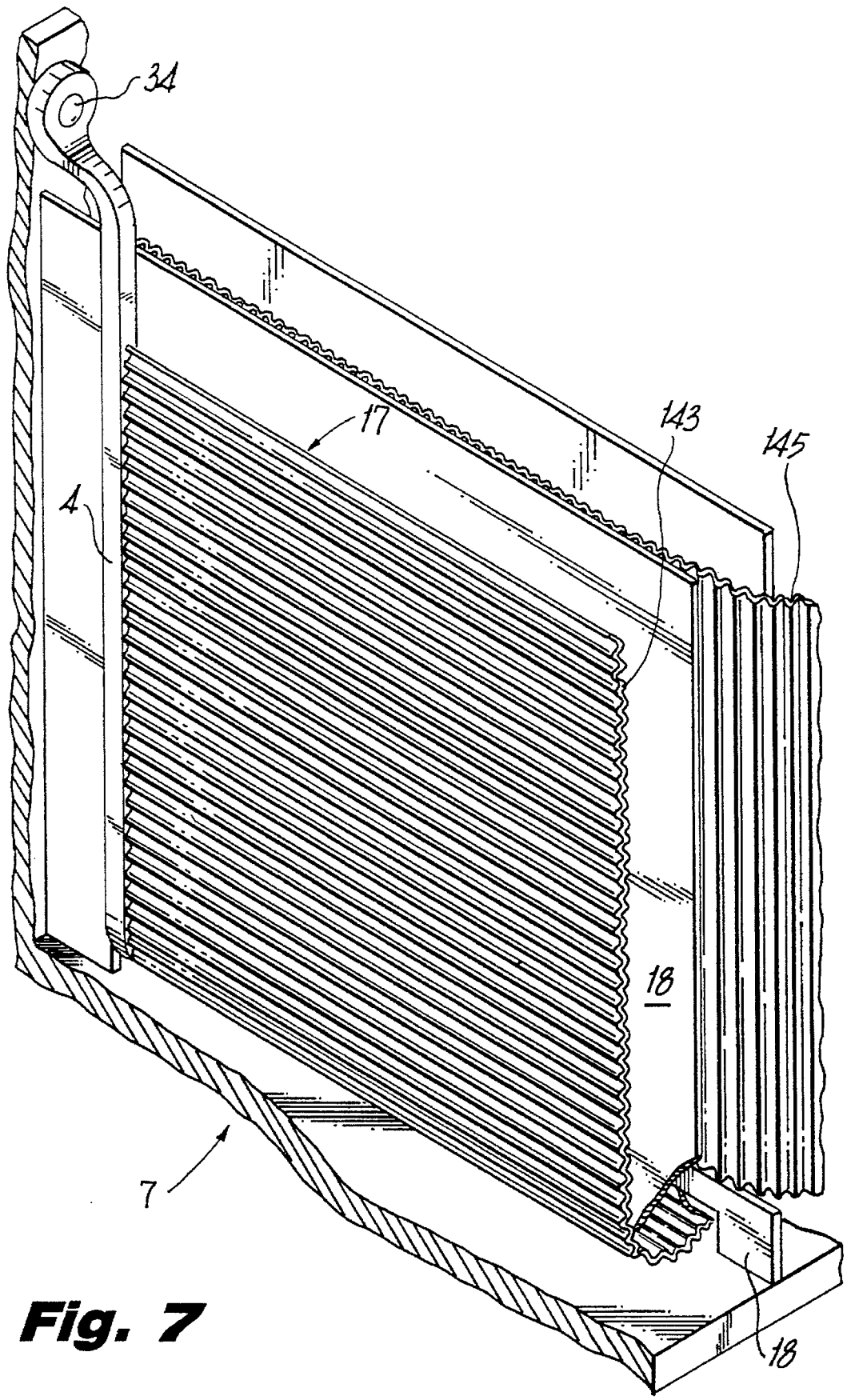
FIG. 7 is an isometric view of a portion of the cell construction of FIG. 6, illustrating a pleated single plate construction.

Preferably, as shown in FIG. 6, the negative plate 143 is a single convoluted member which runs vertically, bending in a continuous serpentine fashion within the available space of the battery housing, and the positive plate 145 is a single convoluted member which runs horizontally, bending in a continuous serpentine fashion and interweaving with negative plate 143. Separators 18 are interposed between the two plates, to provide electrical insulation and allow relatively free passage to the electrolyte ions. Both the positive and negative plates 143 and 145 may be fabricated from solid lead sheets, as shown in FIG. 6, or preferably, the plates are pleated lead sheets, as shown in FIG. 7. Pleated sheets for this embodiment also provide an increased surface area for ion exchange, as well as facilitating bending of the plate in the above described serpentine fashion.

It should be noted that instances may occur where the plates may short circuit at the bends. For example, the plates may shift while the battery is moved, or the plates may expand, by heat expansion, and contact at the point of the bends. Another instance which may cause the plates to short is the growth of dendrites. Typically, dendrites are lead sulfate crystals which accumulate during discharge between two opposite polarity plates. Although lead sulfate is typically an insulator, it becomes conductive during the next battery charge, when it converts to either "spongy lead" or lead peroxide. To prevent the plates from shorting, the separators 18 are shown with cuts such as 140, 141, 153 and 154, which support the plate bends. In addition, the cut separator material may be folded, as shown by folded portions 149, 152 and 155, at an angle of, for example, 90° to fix the position of the plates relative to one another and to further preclude shorting between the two polarity plates, either directly or through the growth of dendrites. This is illustrated in FIG. 6, where the two separators are cut and folded under the bend 144 of the plate 143.

Figure 8:
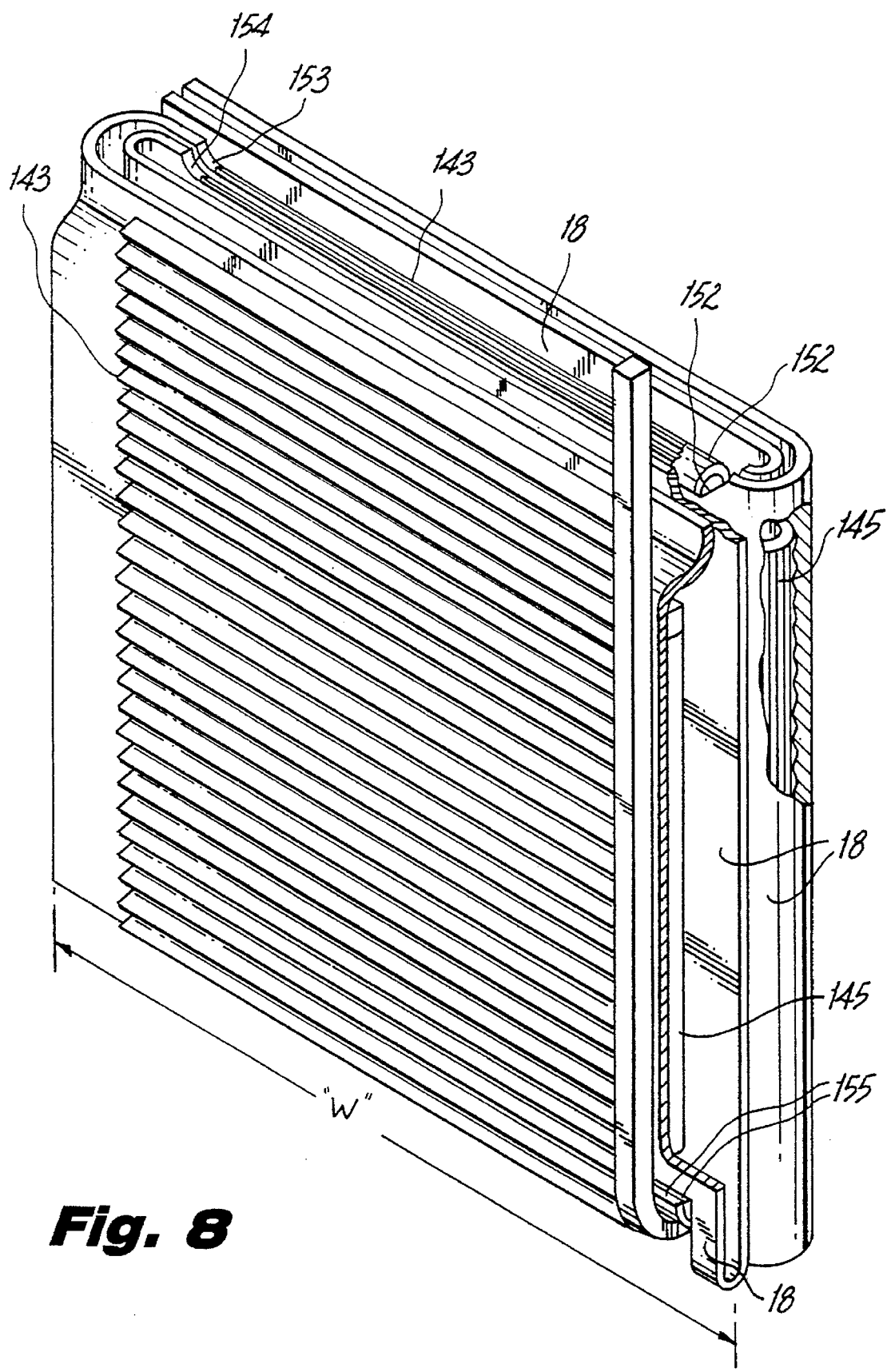
FIG. 8 is an isometric view of a portion of the cell construction similar to FIG. 6, illustrating an alternative plate construction using oversized separators.

An alternative construction for insulating the plates is shown in FIG. 8. In this embodiment, to insulate the plates, one polarity plate, e.g., negative plate 143, is cemented onto a separator 18 having a width "W" which exceeds the width of the plate. This configuration provides a safe margin on each side of the two polarity plates and permits constructing the cell by folding of the plates in the serpentine interweaved manner shown in FIG. 8.

To construct the cell using this alternative construction, the separator is folded in two and a first polarity plate is positioned between the folded separator. The first polarity plate such as plate 145 is centered and cemented onto one side of the folded separator material at the four corners of the separator material. The first polarity plate and the separator material are then folded back and forth in a serpentine fashion. Simultaneously, a second polarity plate such as plate 143 is interweaved with the first polarity plate, also bending back and forth in a serpentine fashion. Separator cuts 153 and 154 with folds 152 and 155 secure the position of the second polarity plate over the separators covering the first polarity plate, while the position of the first polarity plate is secured inside the separators with gluing.

Preferably, when positioning the interwoven cell inside the case 12 so that the folded side of the separator is positioned adjacent the bottom of the case. In this configuration, the open side of the separator is positioned adjacent the top of the case 12 to permit hydrogen and oxygen bubbles to escape to the top region of the case.

Pleating the Battery Plates

Figure 9:
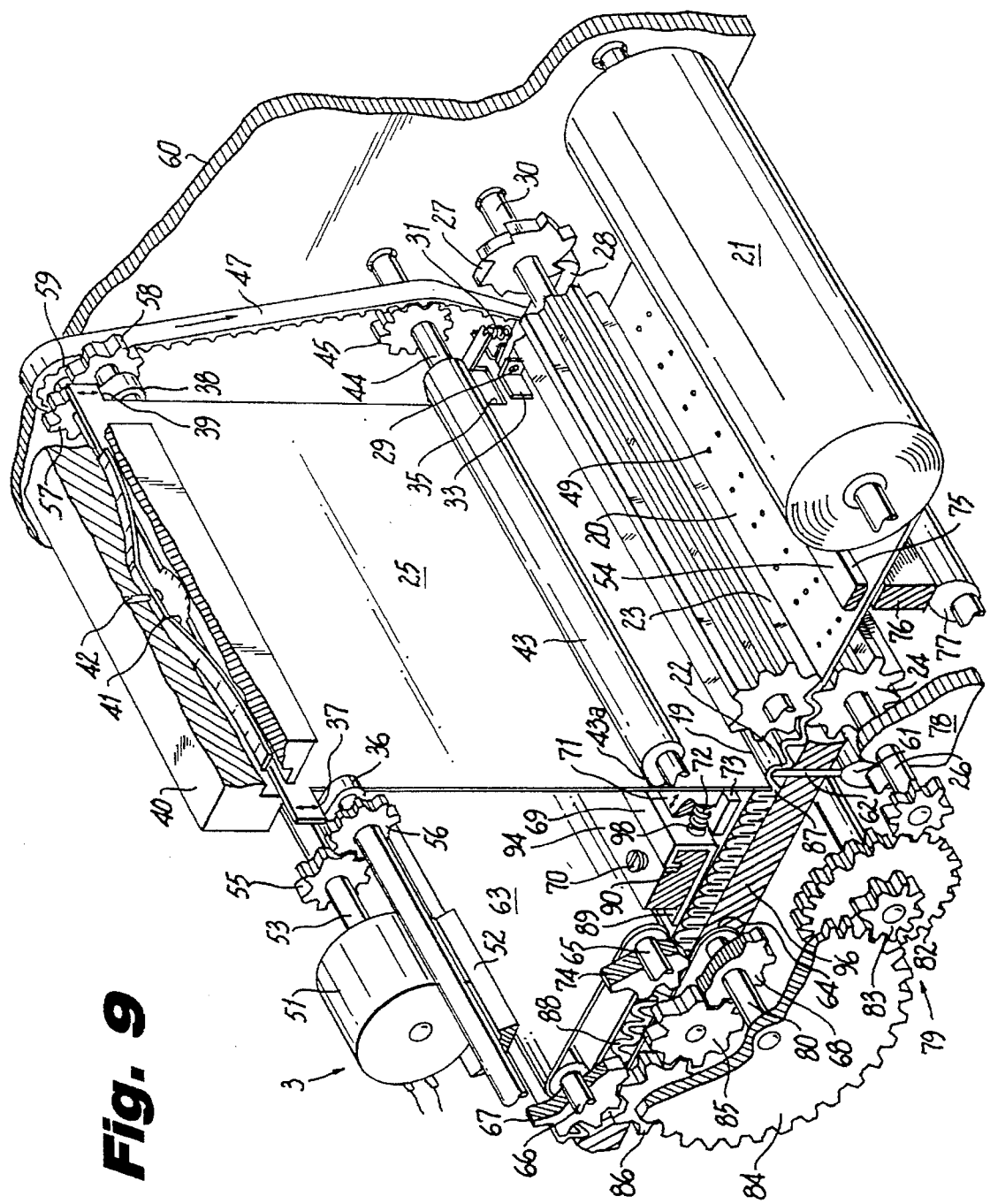
FIG. 9 is an isometric cut-away view in partial cross-section of an apparatus for pleating thin sheets and for setting the density of the pleating.

Referring to FIG. 9, an apparatus 3 is shown for pleating battery plates from roll sheets which may be solid or perforated. In the following discussion the side nearest the observer will be referred to as the front, so that the sheet moves from right to left. Preferably, the sheet 20 in roll 21 is in the form of lead foil of the order of 0.001 cm in thickness and having lead purity of between about 99.85 percent and about 99.94 percent. Sheet 20 is fed through a pair of meshed pinion gears 23 and 24, which alter the foil surface from a flat surface to a corrugated type surface 19. A paddle 25 is supported by cams 36 and 38 and extends toward sheet 20. Blade spring 41 positioned within support member 40 by screw 42 is provided to bias paddle 25 toward the sheet 20. Rotation of cam 43 forces the paddle 25 to move to the left so as to compress the last corrugation ridge against the previously compressed ridges 87. Simultaneously, a vertical vane 62 positioned in the next in line corrugation 19 is urged upwardly by the surface of a cam 61, to prevent the corrugated portion from moving to the right. Vane 62 is continuously biased downwardly by springs (not shown) and cam 61 urges the vane 62 upwardly against the biasing action of the springs.

To compress the next in line ridge of the corrugated surface 19, cams 36 and 38 are rotated causing the paddle 25 to be raised over the next ridge of the corrugated surface 19. A reciprocating plate 71 is movably supported by sliders 73 positioned on the front and rear of reciprocating plate 71. Springs 72 are positioned adjacent the front and rear of the reciprocating plate 71, and bias the plate toward paddle 25 as the peak 43a of cam 43 turns toward the right. Preferably, the springs 72 are housed in respective holes on support 94. The sliders 73 of the plate 71 slide on corresponding grooves (not shown) on the front and rear walls 78 and 60.

The paddle 25, after being raised by the cams 36 and 38, is displaced to the right and placed over the next ridge of the corrugated portion 19 by the action of the spring 72 through the plate 71. As noted, the corrugated portion 19 is prevented from moving to the right by the vane 62. Then, as the pair of cams 36 and 38 are further rotated, the paddle 25 is lowered into the trough of the corrugated portion and is urged downwardly by the action of blade spring 41, on the top edge of the paddle 25. The cycle is completed by the motion of vane 62 downwardly away from the sheet and paddle 25 being moved to the left by peak 43a in position to compress the next ridge 87 of the corrugated portion 19 against the previously compressed ridges 87.

Each time the paddle 25 moves to the left, it acts on ratchet 27 through a pawl 28, causing shaft 30 associated with ratchet 27 to rotate pinion gear 23 to form a new ridge in the sheet 20. The pawl 28 is pivoted at pin 29 supported by bracket 33. Bracket 33 is rigidly fastened onto extension 35 of the paddle 25 to firmly secure the bracket 33 to paddle 25.

To set the desired density for the pleating, an adjustable friction is built in the path of the compacted ridges 87 by plate 89 which is supported by groove 90 within support 94 and configured to bias against compressed ridges 87. Biasing the plate 89 towards the horizontal surface 96 defined by the compressed ridges 87, exerts a friction force on the pleated sheet. The greater the force needed to overcome this restriction, the tighter the compacting of the ridges 87 in the compacted plate, i.e., increasing the density of the pleats. Conversely, the smaller the force necessary to overcome the frictional force exerted by plate 89, the lesser the density of the pleats. Plate 89 is adjusted by setting screw 70 positioned at each end of the plate. It is also contemplated that automatic drivers may be utilized to tilt or bias the plate 89. For example, solenoids may be connected to the plate and selectively actuated to tilt or bias the plate.

After overcoming the restriction created by plate 89, the compacted plate passes between two oppositely rotating conveyor belts 63 and 64 which spread the ridges of the compacted pleated plate to a desired density. As noted above, the desired density of the pleats may also compensate for the swelling of the plate which may occur during the forming process of the battery plate. The conveyor belt 63 is supported by shafts 65 and 66 which are driven by gears 67 and 74. Similarly, belt 64 is supported by shaft 80 and a second shaft (not shown), which are similar to shafts 65 and 66, and which are driven by gears 68 and 86. The motion of the belts is derived from the motion of the pinion gear 24 through a reduction gear train involving gears 81, 82, 83, and 84 having predetermined diameters to provide a desirable reduction in the speed of transport of the plate.

Motor 51 supported by a base 52, drives the different gears and cams. The motor shaft 53 drives gears 55 and 57 directly, and is extended to rotate sprocket 59. Sprocket 59 is provided to rotate belt 47. Cams 36 and 38 are then rotated in synchronism through the gears 56 and 58. The belt 47 drives cam 43 through sprocket 45 and the shaft of the cam 61 through a third sprocket (not shown). To reduce friction, the shafts are provided with bearings at the point of support, on the front wall 78 and the rear wall 60.

To perforate sheet 20 prior to creating the pleats, punching station 54 is positioned between the roll 21 and the pinion gears 23 and 24. Numerous punching techniques may be utilized to achieve the desired perforations and their spacing. For example, punching station 54 may include a punch block 76 which supports a plurality of punches, blades or pins, a die 75 having apertures which are positioned to align with the punches on block 76, and a cam 77 positioned adjacent to block 76. It should be noted that piercing is the preferred technique for creating perforations 49. Piercing not only introduces an opening without losing material, but also increases the surface exposed to the electrolyte. This occurs because piercing raises a burr around the opening which can prevent surfaces from making actual contact, e.g., between adjacent pleats and between the separator and the plate, and permits the electrolyte to flow therebetween. In the extreme, a surface resembling that used for grating cheese, may be desirable to provide additional surface and transparency of the plate to electrolyte, without losing lead material or continuity for electrical conduction or its structural integrity.

Casting Electrodes

Figure 10:
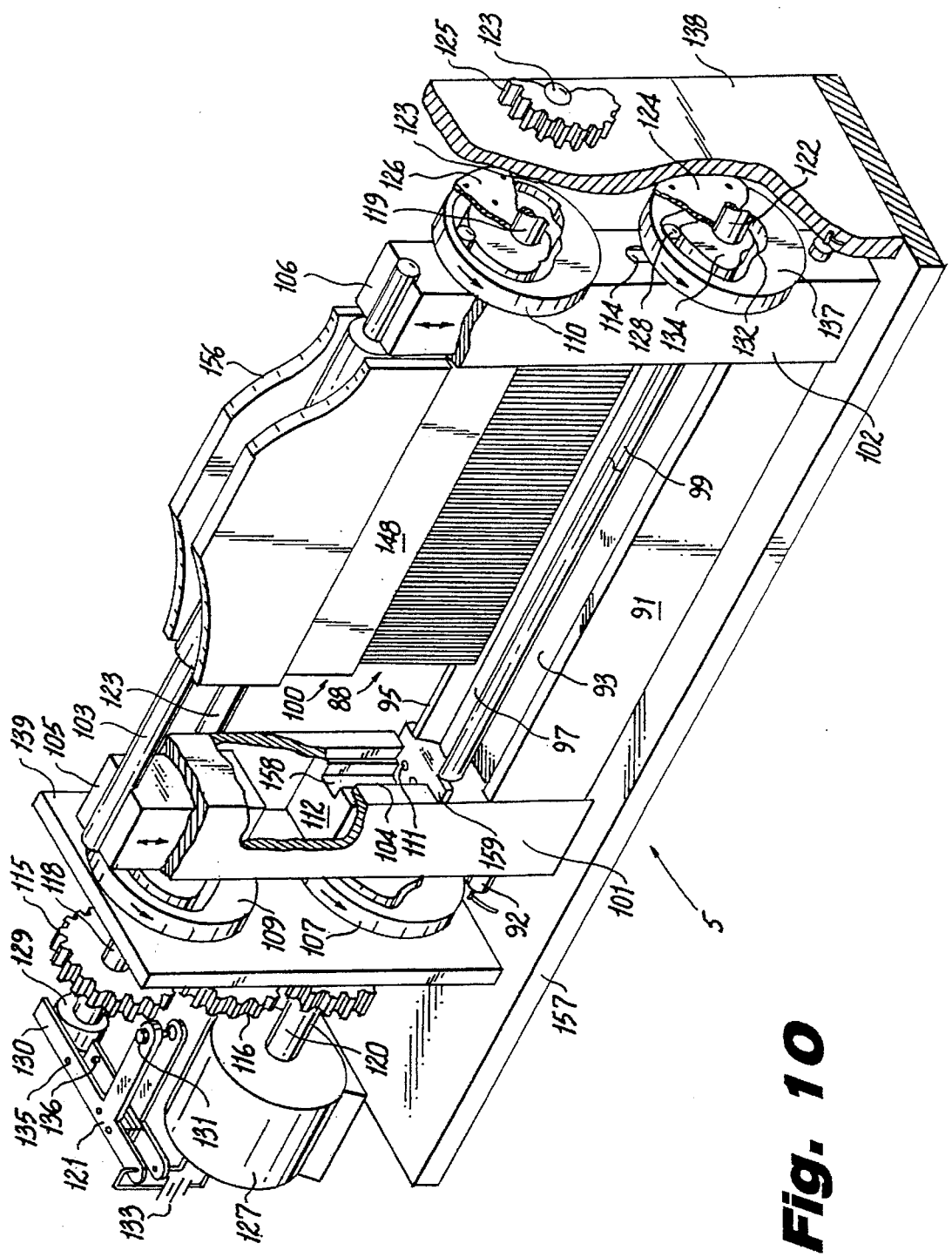
FIG. 10 is an isometric cut-away view in partial cross-section of an apparatus for casting a solid conductive strip along an edge of a battery plate.

Referring now to FIG. 10, an apparatus 5 is shown which is configured to cast an electrode along an edge of a pleated plate 88 to form a monolithic electrode/plate construction. The apparatus 5 includes two vertical brackets 138 and 139, a left column 101 and a right column 102 connected to base plate 157, as shown. Preferably, the columns are hollow to receive plungers 105, 106 and 112 described below. Tank 91 is positioned between columns 101 and 102 and is supported by the columns in a spaced relationship from the base plate 157. Lead 93 is deposited into the tank and is kept in a molten state by electric heater 92. Preferably, the heater 92 is operated at a sufficient voltage to maintain the lead temperature above the melting point temperature of lead, i.e., about 400° C. Plungers 112 are positioned within each column 101 and 102, as shown. Each plunger 112 has a groove 158 configured to receive tray bracket 159 formed into or secured to tray 95. The tray bracket 159 is supported by plungers 112 in columns 101 and 102 through corresponding slots 104 in each column. Tray bracket 159 is fastened to the plungers by screws 111.

Cams 107 and 108 are provided to move tray 95 between a heating position and a cooling position. The heating position is the position of the tray when inserted in the tank 91, and the cooling position is the position of the tray 95 when removed from the tank 91. Cam 107 is rotated by shaft 120 of motor 127, and the rotational movement of shaft 120 is translated to cam 108 to synchronously rotate the cam 108 with cam 107. To translate the rotational movement of shaft 120 to cam 108, connecting shaft 123 is extended from vertical bracket 138 to vertical bracket 139. Gears 125 are connected to each end of the connecting shaft 123 on the exterior of each vertical bracket 138 and 139. A gear train (not shown) between shaft 120 and shaft 123 translates the rotational movement of shaft 120 to shaft 123. Gear 125 connected to shaft 123 adjacent bracket 138 translates the rotational movement of the shaft 123 to cam shaft 122 via an intermediate gear train (not shown).

Preferably, each cam 107 and 108 is constructed with similar grooves to ensure synchronous movement of tray 95, as described below. As shown in FIG. 10, each cam 107 and 108 has a groove 132, preferably, formed of two parts, an inner part 134 and an outer part 137. The inner part 134 is connected to cam shaft 122, and the outer part 137 is connected in a spaced relationship with the inner part 134 by plate 124 so as to define groove 132 and define the camming surface. Pin 128 is an integral part of each plunger 112 and extends through slot 114 in columns 101 and 102 and into groove 132 of each cam 107 and 108. In this configuration, rotational movement of each cam 107 and 108 is translated to vertical movement of tray 95 within slots 104 of columns 101 and 102.

Plungers 105 and 106 are provided to move pleated plate 88 between a fusing position and a solidifying position. The fusing position is the position of the plate when inserted into tray 95, and the solidifying position is the position of the plate when removed from the tray. Clamp 100 is connected to clamp holding rod 103, which extends between plungers 105 and 106 as shown in FIG. 10. Clamp 100 includes a lower portion 148 and a pair of extensions 156. Lower clamping portion 148 is provided to releasably hold pleated plate 88 in a predefined relationship with respect to tray 95. Movement of extensions 156 toward and away from each other opens and closes, respectively, the lower clamping portion. Extensions 156 may be manually moved toward each other or may be moved toward each other with automatic instrumentation.

Preferably, clamp 100 is positioned in close proximity to either column 101 or 102. As a result, pleated plate 88 is deposited into tray 95 while leaving a space for casting an extension, similar to extension 11, shown in FIG. 2, of solid lead plate edge for later coupling or fusing with electrodes 6 and 16. The position of pleated plate 88 with respect to tray 95 is determined by cams 109 and 110. Preferably, cams 109 and 110 are constructed similar to cams 107 and 108, except that the groove 132 may be dimensioned differently to ensure proper cycling. Rotation of shaft 120 is translated through gear trains 115 and 116 to shaft 118 which is connected to cam 109. Cam 110 is synchronously rotated with cam 109 via shaft 123 and gear 125. It is of course also contemplated that clamp 100 may remain stationary and that tray 95 be movable with respect to plate 88, and vice versa.

In operation, a precut piece of lead wire, identified hereinafter as a lead charge 97, having a diameter of approximately 0.4 cm is loaded into tray 95. To prevent the lead from sticking to the inner surface of tray 95, a piece of aluminum foil 99 may be positioned over the inner surface of the tray.

Actuation of pushbutton 131 energizes motor 127 and begins the cycling of cams 107 and 108. Cams 107 and 108 lower tray 95 into the tank 91 of molten lead. The tray 95 is partially immersed into the molten lead for approximately 20 seconds which allows the lead charge 97 to melt and its temperature to be raised close to that of the molten lead 93. While the tray 95 is held at this position, rotation of cams 109 and 110 cause the pleated plate 88 to be lowered into the molten lead charge 97 in tray 95. After a predetermined period of time, preferably seven seconds, the lead surface along the edge of the pleated plate 88 begins to melt and fuse with the molten lead charge 97. At this point, cams 107 and 108 raise the plungers 112 thus removing tray 95 from the molten lead in tank 91. Simultaneously, cams 109 and 110 raise the pleated plate 88, allowing the molten lead charge 97 to solidify as an integral part of the pleated plate.

Upon completion of a full revolution of the cams 107, 108, 109 and 110, cam 129 raises blade 130 of switch 121 so that the switch contacts 135 and 136 open to disconnect power to motor 127 and inhibit further cycling of the cams. To reactivate the cycle, pushbutton switch 131 must again be actuated.

Referring again to FIGS. 2 and 10, the fusing of the ends of the lead plate extensions 11 into an interconnecting solid lead electrode 6 may also be accomplished using the apparatus 7. A platform, not shown, may be configured as an extension which is supported by the plungers 105 and 106 to maintain the plates 10 or 17 of same polarity in a properly spaced relationship. In operation, the solid lead extensions 11 which were cast with the pleated plate are dipped into the molten lead charge by the cycling of the cams as described above. Once the tray 95 is removed from the tank 91, the molten lead begins to solidify and form electrodes between extensions 11. Alternately, the operation of fusing the plate extensions to the interconnecting electrode 6 or 16, may be accomplished by holding and dipping the plates by hand into the tray 95 at the time the pair of plungers 105 and 106 are being lowered, and then allowing the plate assembly to be raised synchronously with the tray 95 while manually removing the plate with the new interconnecting electrode, from tray 95 when the lead charge in the tray 95 solidifies.

It will be understood that various modifications can be made to the embodiments of the present invention herein disclosed without departing from the spirit and scope thereof. For example, various sizes of the cells are contemplated, as well as various densities of construction for the pleated plates. Also, various modifications may be made in the configuration of the apparatus used to fabricate the cells for the battery. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. A storage battery, which comprises:

a casing;

at least one battery cell positioned within said casing, said battery cell including at least one pleated negative polarity plate having a thickness of between about 1.5 mm and about 7.5 mm and positioned adjacent at least one pleated positive polarity plate having a thickness of about between 1.5 mm and about 7.5 mm, said pleated negative and positive polarity plates being immersed in an electrolyte;

at least one separator positioned between said at least one pleated negative polarity plate and said at least one pleated positive polarity plate;

a negative conductor monolithically coupled to said at least one pleated negative polarity plate to form a monolithic plate and conductor construction;

a positive conductor monolithically coupled to said at least one pleated positive polarity plate to form a monolithic plate and conductor construction;

a negative output terminal coupled to said negative conductor and extending at least partially from said casing; and a positive output terminal coupled to said positive conductor and extending at least partially from said casing.

2. A storage battery, which comprises:

a casing;

at least one battery cell positioned within said casing, said battery cell including at least one pleated negative polarity plate positioned adjacent at least one pleated positive polarity plate, said pleated negative and positive polarity plates being immersed in an electrolyte;

at least one separator positioned between said at least one pleated negative polarity plate and said at least one pleated positive polarity plate;

a negative conductor monolithically coupled to said at least one pleated negative polarity plate;

a positive conductor monolithically coupled to said at least one pleated positive polarity plate;

a negative output terminal monolithically coupled to said negative conductor and extending at least partially from said casing; and a positive output terminal monolithically coupled to said positive conductor and extending at least partially from said casing.

3. The storage battery according to claim 2, wherein said at least one battery cell includes a plurality of pleated negative polarity plates and a plurality of pleated positive polarity plates, wherein each negative polarity plate is positioned adjacent a positive polarity plate, and wherein said negative polarity plates are monolithically interconnected by a negative conductive bus to form said negative conductor and said positive polarity plates are monolithically interconnected by a positive conductive bus to form said positive conductor.

4. The storage battery according to claim 3, wherein said negative output terminal is coupled to said negative conductive bus and said positive output terminal is coupled to said positive electrode bus.

5. The storage battery according to claim 2, wherein said at least one pleated negative polarity plate has a pleating density between about 0 pleats/cm and about 500 pleats/cm.

6. The storage battery according to claim 2, wherein said at least one pleated positive polarity plate has a pleating density between about 0 pleats/cm and about 500 pleats/cm.

7. The storage battery according to claim 2, wherein each said at least one pleated negative polarity plate and each said at least one pleated positive polarity plate is fabricated from a solid lead sheet having perforations spatially positioned therethrough.

8. The storage battery according to claim 2, wherein each said at least one pleated negative polarity plate and each said at least one pleated positive polarity plate is fabricated from woven threads.

9. The storage battery according to claim 8, wherein said woven threads are fabricated from lead.

10. A storage battery, which comprises:
    a casing;
    at least one battery cell positioned within said casing and having a single pleated negative polarity plate interrelated with a single pleated positive polarity plate, wherein at least one of said polarity plates is substantially U-shaped;
    at least one separator positioned between said interrelated negative polarity plate and positive polarity plate;
    a negative output terminal coupled to said single pleated negative polarity plate and extending at least partially from said casing; and
    a positive output terminal coupled to said single pleated positive polarity plate and extending at least partially from said casing.

11. The storage battery according to claim 10, wherein said pleated negative polarity plate is substantially U-shaped to define a pair of sides and a cross-arm therebetween, and said pleated positive plate is substantially U-shaped to define a pair of sides and a cross-arm therebetween, and wherein said U-shaped plates are interrelated so that one side of said pleated negative polarity plate is positioned between said pair of sides of said pleated positive polarity plate, and so that one side of said positive polarity plate is positioned between said pair of sides of said negative polarity plate.

12. The storage battery according to claim 10, wherein said pleated negative polarity plate is substantially U-shaped to define a pair of sides and a cross-arm therebetween and said pleated positive polarity plate is substantially planar, and wherein said pleated negative and positive plates are interrelated such that said planar positive polarity plate is positioned between said pair of sides of said negative polarity plate.

13. The storage battery according to claim 10, wherein said pleated positive polarity plate is substantially U-shaped to define a pair of sides and a cross-arm therebetween and said negative polarity plate is substantially planar, and wherein said pleated positive and negative plates are interrelated such that said planar negative polarity plate is positioned between said pair of sides of said positive polarity plate.

14. The storage battery according to claim 10, wherein said pleated negative polarity plate has perforations spatially positioned therethrough.

15. The storage battery according to claim 10, wherein said pleated positive polarity plate has perforations spatially positioned therethrough.

16. The storage battery according to claim 10, wherein each of said positive and negative polarity plates are fabricated from a solid lead sheet.

17. The storage battery according to claim 16, wherein said solid lead sheet has a thickness of about 0.001 cm.

18. The storage battery according to claim 10, wherein said positive and negative polarity plates are fabricated from woven lead threads.

19. Cell construction for storage batteries, which comprises:
    at least one pleated negative polarity plate;
    at least one negative conductor monolithically coupled to said at least one pleated negative polarity plate;
    at least one pleated positive polarity plate positioned adjacent said at least one negative polarity plate;
    at least one positive conductor monolithically coupled to said at least one pleated positive polarity plate; and
    at least one separator having a plurality of notches and positioned between said at least one pleated negative polarity plate and said at least one pleated positive polarity plate.

20. Cell construction for storage batteries, which comprises:
    a single negative polarity plate;
    a single positive polarity plate interrelated in a corrugated configuration with said single negative polarity plate; and
    at least one separator having a plurality of notches and positioned between said interrelated negative polarity plate and positive polarity plate.

21. A method for forming battery cells, comprising:
    folding a sheet of separator material having a plurality of notches about a first polarity plate;
    securing said first polarity plate to one side of said folded sheet of separator material;
    folding said first polarity plate and said folded sheet of separator in a corrugated configuration;
    folding a second polarity plate in a corrugated configuration; and
    interweaving said folded second polarity plate with said folded first polarity and said separator material.

22. The method according to claim 21, wherein said step of interweaving includes positioning at least a portion of said folded second polarity plate within said plurality of notches in said separator material such that said second polarity plate is supported by said folded separator material.

23. The method according to claim 22, wherein each notch in said separator material is folded so as to electrically isolate said first and second polarity plates.

24. An apparatus for pleating battery plates, which comprises:
    means for imparting ridges in a sheet of battery plate material;
    means for compressing said ridges in said sheet to form a pleated sheet; and adjusting means for setting pleat density in said pleated sheet.

25. The apparatus according to claim 24 further comprising means for perforating said sheet of battery plate material.

26. The apparatus according to claim 24, wherein said imparting means comprises a pair of pinion gears each positioned on one side of said sheet, and configured to engage said sheet of battery material to impart said ridges.

27. The apparatus according to claim 24, wherein said compressing means comprises a paddle selectively engagable with said ridges and configured to compress a next ridge in a line along a length of said sheet.

28. The apparatus according to claim 24, wherein said density setting means includes a friction member which engages said compressed ridges of said sheet and which exerts a friction force against said ridges, and means for moving said compressed ridges to overcome said predetermined friction force.

29. An apparatus for monolithically combining battery plate conductors and battery plates, which comprises:
   means for holding a quantity of molten conductive material;
   means for releasably supporting at least one battery plate such that one end of said plate is aligned with said holding means; and
   means for moving said battery plate between a fusing position and a solidifying position wherein when said at least one battery plate is at said fusing position an edge of said at least one battery plate makes contact with said molten conductive material, and wherein when said at least one battery plate is at said solidifying position said battery plate does not make contact with said molten conductive material.

30. A storage battery, which comprises:
   a casing;
   a plurality of battery cells positioned within said casing and connected in series, each cell having a single pleated negative polarity plate interrelated with a single pleated positive polarity plate such that one of said plates defines a lowest potential and another of said plates defines a highest potential;
   at least one separator having a plurality of notches positioned between said interrelated negative polarity plate and positive polarity plate;
   a negative output terminal coupled to said single pleated negative polarity plate defining said lowest potential and extending at least partially from said casing; and
   a positive output terminal coupled to said single pleated positive polarity plate defining said highest potential and extending at least partially from said casing.

31. A cell construction for storage batteries according to claim 20, wherein at least a portion of at least one of said polarity plates is positioned within said plurality of notches in said at least one separator such that said at least one of said polarity plates is supported by said separator.

32. A storage battery, which comprises:
   a casing;
   at least one battery cell positioned within said casing and having a single pleated negative polarity plate interrelated with a single pleated positive polarity plate, wherein said single pleated negative polarity plate is folded in a corrugated configuration and said single pleated positive polarity plate is folded in a corrugated configuration, and wherein said folded negative and positive polarity plates are interwoven to define said interrelation between said plates;
   at least one separator positioned between said interrelated negative polarity plate and positive polarity plate;
   a negative output terminal coupled to said single pleated negative polarity plate and extending at least partially from said casing; and
   a positive output terminal coupled to said single pleated positive polarity plate and extending at least partially from said casing.

* * * * *